United States Patent
VanBlon et al.

(10) Patent No.: US 12,313,421 B2
(45) Date of Patent: May 27, 2025

(54) METHOD FOR CONTEXTUAL NAVIGATION DIRECTION ORIENTATION

(71) Applicant: Lenovo (United States) Inc., Morrisville, NC (US)

(72) Inventors: Russell Speight VanBlon, Raleigh, NC (US); Mark Delaney, Raleigh, NC (US); Nathan Peterson, Oxford, NC (US); John C. Mese, Cary, NC (US); Arnold Weksler, Raleigh, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 42 days.

(21) Appl. No.: 17/684,136

(22) Filed: Mar. 1, 2022

(65) Prior Publication Data
US 2023/0280177 A1 Sep. 7, 2023

(51) Int. Cl.
*G01C 21/36* (2006.01)
*G01C 21/34* (2006.01)

(52) U.S. Cl.
CPC ....... *G01C 21/367* (2013.01); *G01C 21/3415* (2013.01); *G01C 21/3614* (2013.01); *G01C 21/3617* (2013.01); *G01C 21/3694* (2013.01)

(58) Field of Classification Search
CPC .............. G01C 21/367; G01C 21/3415; G01C 21/3614; G01C 21/3617; G01C 21/3694
See application file for complete search history.

(56) References Cited

U.S. PATENT DOCUMENTS

| | | | |
|---|---|---|---|
| 6,249,740 B1* | 6/2001 | Ito | G06Q 10/047 701/437 |
| 10,001,383 B2* | 6/2018 | Blumenberg | G06F 3/04845 |
| 2012/0316771 A1* | 12/2012 | Damon | G01C 21/3626 701/442 |
| 2018/0293769 A1* | 10/2018 | Rusu | G09B 29/007 |
| 2019/0316919 A1* | 10/2019 | Keshavamurthy | G08G 1/096844 |
| 2021/0372803 A1* | 12/2021 | van der Vlist | G01C 21/3635 |

FOREIGN PATENT DOCUMENTS

KR  2016149358 A  * 12/2016  ......... G01C 21/3632

OTHER PUBLICATIONS

Machine translation KR-2016149358-A (Year: 2016).*
Tesla, "I wonder how the market will react to the reemergence of the electric car?", Tesla Motors Club, Aug. 16, 2006, pp. 1-6.

* cited by examiner

*Primary Examiner* — Anne Marie Antonucci
*Assistant Examiner* — Wesam Almadhrhi
(74) *Attorney, Agent, or Firm* — Kunzler Bean & Adamson

(57) ABSTRACT

An apparatus for setting an orientation mode includes a processor and a memory that stores code executable by the processor to a context for a route to be navigated by a user. In various examples, the code causes the processor to determine an orientation mode for the context. In various examples, the code causes the processor to set an orientation mode for a navigation system to a first orientation mode based on the context. A method and a computer program may perform the functions of the apparatus.

20 Claims, 8 Drawing Sheets

METHOD FOR CONTEXTUAL NAVIGATION DIRECTION ORIENTATION

FIELD

The subject matter disclosed herein relates to navigation apparatus, systems, and methods and more particularly relates to navigation direction orientation based on contextual information.

BACKGROUND

Navigation systems, apparatuses, and methods facilitate the efficient transport of people and goods worldwide using various transport means and various transport modes. However, current navigation systems, apparatuses, and methods do not adapt to the context in which a user uses them to navigate. Specifically, current navigation systems, apparatuses, and methods do not orient the navigational information presented in a manner adapted to the context for the navigation.

BRIEF SUMMARY

Apparatuses, methods, systems, and program products are disclosed for setting an orientation mode. An apparatus is disclosed for setting an orientation mode includes a processor and a memory that stores code executable by the processor to determine a context for a route to be navigated by a user. In various examples, the code causes the processor to determine an orientation mode for the context and to set an orientation mode for a navigation system to a first orientation mode based on the context.

A method for setting an orientation mode is disclosed. The method in various examples includes determining a context for a route to be navigated by a user based on one or more factors. The method, in one or more examples, includes determining an orientation mode for the context and setting an orientation mode for a navigation module to a first orientation mode based on the determined context and displaying map data on a display in communication with the navigation module using the first orientation mode.

A computer program product for setting an orientation mode is disclosed. The computer program product, in some examples, includes a computer readable storage medium that stores code executable by a processor, the executable code comprising code to determine a context for a route to be navigated by a user based on one or more factors. In certain examples, the code is executable to determine an orientation mode for the context and set an orientation mode for a navigation module to a first orientation mode based on the determined context and display map data on a display in communication with the navigation module using the first orientation mode and confirm the determined context with a user and change the orientation mode from the first orientation mode to a second orientation mode in response to user input identifying a different context from the determined context.

BRIEF DESCRIPTION OF THE DRAWINGS

A more particular description of the examples briefly described above will be rendered by reference to specific examples that are illustrated in the appended drawings. Understanding that these drawings depict only some examples and are not, therefore, to be considered to be limiting of scope, the examples will be described and explained with additional specificity and detail through the use of the accompanying drawings, in which.

DETAILED DESCRIPTION

Figure 1A:
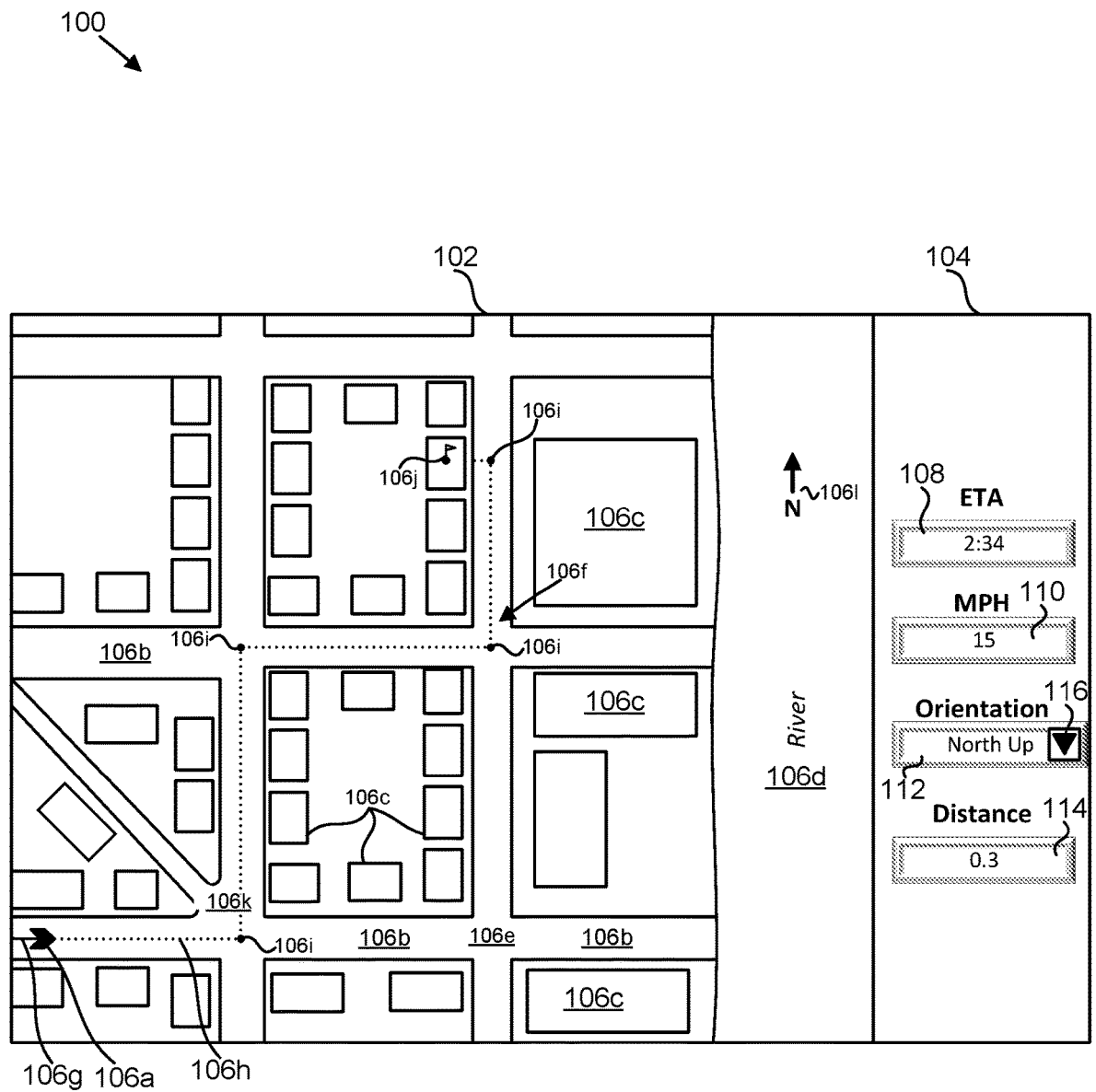
FIG. 1A depicts an example user interface that presents map data according to an orientation mode, according to one or more examples of the present disclosure.

As will be appreciated by one skilled in the art, aspects of the disclosure may be implemented as a system, a method, and/or a program product. Accordingly, examples may take the form of an entirely hardware implementation, an entirely software implementation (including firmware, resident software, micro-code, etc.) or an implementation combining software and hardware aspects that may all generally be referred to herein as a "circuit," "module" or "system." Furthermore, examples may take the form of a program product implemented in one or more computer readable storage devices storing machine-readable code, computer readable code, and/or program code, referred hereafter as code. The storage devices may be tangible, non-transitory, and/or non-transmission. In certain examples, the storage devices only employ signals for accessing code.

Various of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices or the like.

Modules may also be implemented in code and/or software for execution by various types of processors. For example, an identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module or controller.

Indeed, a module of code or may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device.

Code for carrying out operations for examples may be written in any combination of one or more programming languages including an object-oriented programming language such as Python, Ruby, R, Java, JavaScript, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). It may be noted that as used herein, the term "computer" may refer to any type or form of information handling device unless otherwise clear from context.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one example," "an implementation," or similar language means that a particular feature, structure, or characteristic described in connection with the example is included in at least one implementation. Thus, appearances of the phrases "in one example," "in an example," and similar language throughout this specification may, but do not necessarily, all refer to the same example or implementation. Similarly, select aspects of the disclosure which are "according to one or more examples of the present disclosure" means that the selected aspects may be present in at least one example, may be present in more than one example, and may be present in all examples.

The terms "including," "comprising," "having," and variations thereof mean "including but not limited to," unless expressly specified otherwise. An enumerated listing of items does not imply that any or all of the items are mutually exclusive unless expressly specified otherwise. The terms "a," "an," and "the" also refer to "one or more" unless expressly specified otherwise. The term "and/or" indicates examples of one or more of the listed elements, with "A and/or B" indicating examples of element A alone, element B alone, or elements A and B taken together. Likewise, as used herein, the phrase "at least one of" indicates examples of one or more of the listed elements, with "at least one of A and B" indicating examples of element A alone, element B alone, or elements A and B taken together. In other words, with respect to listed elements, the terms "and/or," and "at least one of" indicate examples of any of the listed elements alone as well as examples with any combination of the listed elements.

"Data" refers to a set of information organized in a way that facilitates communication of the information to a receiver. The receiver may be a person or animal or an electronic component, circuit, assembly, or the like. Data can be represented as signal or values represented in any numbering and/or alphabet system. Data can be stored in one representation in an analog or digital format and conveyed to a receiver in another format suitable for the receiver to interpret and understand the data. Data can include both data that stores specific information as well as metadata which is data that describes the data that stores the specific information.

Data can be organized in a structured or unstructured format. "Structured data" refers to data within a data structure that is organized according to a predefined format, protocol, or configuration such that the structure may be used to facilitate working with the data. Examples of structured data include, but are not limited to, files, databases, database records, database tables, database schemas, serialized objects, directories, and the like. "Unstructured data" refers to data stored without a particular organization, predefined format, protocol, or configuration. Examples of unstructured data include, but are not limited to, content of a text message, content of an email message, text content of a file, content of a document, and the like.

Often the term "data" will be used in connection with one or more adjectives that identify a type or purpose for the data, examples include "user data", "input data", "output data", "sensor data", "patient data", "system data", "map data", and the like. "Sensor data" refers to any data or information registered by one or more sensors. Examples of sensor data include an amount of current passing through the sensor, an amount of voltage across the sensor, an amount of electrical resistance through the sensor, an amount of strain experienced by the sensor, an acceleration vector, a deceleration vector, an orientation, an orientation angle, a direction, and the like.

Furthermore, the described features, structures, or characteristics of the examples may be combined in any suitable manner. In the following description, numerous specific details are provided, such as examples of programming, software modules, user selections, network transactions, database queries, database structures, hardware modules, hardware circuits, hardware chips, etc., to provide a thorough understanding of examples. One skilled in the relevant art will recognize, however, that examples may be practiced without one or more of the specific details, or with other methods, components, materials, and so forth. In other instances, well-known structures, materials, or operations are not shown or described in detail to avoid obscuring aspects of an example.

Aspects of the examples are described below with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other information handling device to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, an information processing device, or other device to function in a particular manner, such that the instructions stored in the storage device produce an article of manufacture including instructions which implement the function/act specified in the schematic flowchart diagrams and/or schematic block diagrams block or blocks.

The code may also be loaded on to a computer, an information processing device, or other device, to cause a series of operational steps to be performed on the computer, or information handling device to produce a computer implemented process such that the code which executes on the computer, the information processing device, or the other device, provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various examples. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding examples. Indeed, some arrows or other connectors may be used to indicate only the logical flow of the depicted example. For instance, an arrow may indicate a waiting or monitoring period of unspecified duration between enumerated steps of the depicted example. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate examples of like elements. Reference numbers in the figures may include a base number and/or a base number followed by a lowercase letter to refer to different individual elements. A reference to a base number may refer to various elements of the group of elements having the base number including those elements referenced by a base number followed by a lowercase letter, unless otherwise clear from the context.

As used herein, a "navigational system", "navigation system", "navigation software", and/or a "navigation module" refers to an apparatus, device, component, system, assembly, mechanism, hardware, software, firmware, circuit, module, set of data, or logic structured, organized, configured, programmed, designed, arranged, or engineered to facilitate navigation of a user or goods from a place of origination to a destination. "Navigation" refers to the process or activity of accurately ascertaining one's position and planning and following a route. (Search "define navigation" on google.com. Oxford Languages, Copyright 2022. Oxford University Press. Web., Modified. Accessed 17 Feb. 2022.) "Icon" refers to a symbol, graphic, drawing, picture, image, or other representation of an actual, logical, virtual, or metaphorical object, activity, method, process, process step, feature, geographic feature, aspect, or concept.

"Orientation mode" refers to a mode of operation for a navigation apparatus, system, method, module, component, firmware, circuit, and/or software that identifies how navigational information, navigation data (e.g., a map data) is presented to a user. A number of orientation modes may exist depending on the means of transport being used, mode of transport being used, and other factors. Examples of orientation modes include but are not limited to heading up orientation mode, north up orientation mode, course up orientation mode, and the like. "Mode" refers to a state of operation for a circuit, sub-circuit, circuitry, electronic component, hardware, software, firmware, module, logic, device, button, lever, or apparatus. When a mode is activated the circuit, sub-circuit, circuitry, electronic component, hardware, software, firmware, module, logic, device, or apparatus may perform a set of functions that are different from when the mode is not activated. In certain embodiments, a mode may be represented by one or more states in a state machine. Often "mode" is used with a modifier describing and differentiating one mode or operating state from another, for example an "operating mode" relates to a mode of operation, a "calibration mode" relates to a mode of calibrating, a "distance mode" relates to distance operations, an "orientation mode" relates to navigational operations, and an "angle mode" relates to angles. "Orientation" refers to a direction a person or object is pointing or moving. Often an orientation is defined in relation to geographic compass direction, such as cardinal directions (e.g., North, South, East, West).

By way of introduction, use navigation or navigational systems, modules, apparatuses, firmware, and/or software has become common. At the same time, navigational systems have developed at least two common orientation modes. Typically, the navigational systems default to using one of the orientation modes until a user indicates a different orientation mode. While navigational systems may permit a user to switch the orientation mode, doing so may prove to be a safety hazard as the user may be in the middle of navigating while a switch of orientation modes is being made, or attempted.

Furthermore, switching orientation modes may be inconvenient for the user. In particular, a user may desire to use one orientation mode rather than another depending on a context for the navigation. When a context first changes, a user then must change the orientation mode and when the context changes a second time the user must change the orientation mode once again or change the orientation mode back to an original orientation mode. Existing navigational systems do not anticipate the orientation mode for a particular user and/or a particular context. The present disclosure provides examples of apparatuses, methods, systems, and computer program products that can determine and/or anticipate a suitable orientation mode for a particular user and/or a particular context.

Accordingly, the systems, apparatuses, and methods of the present disclosure address these and similar issues by providing that can automatically determine and/or set an orientation mode for a navigation system based on the context for the navigation, thereby improving the safety and convenience of navigational systems and modules. The advantages of the systems, apparatuses, and methods disclosed herein, are particularly notable for various types of navigational systems including those built specifically for navigation, those integrated or installed into a vehicle or means of transportation, and/or portable electronic devices such as laptops, tablets, smartphones, action cameras, and so forth, which include navigation systems, modules, software, and/or navigation functionality.

FIG. 1A depicts an example user interface 100 that presents map data according to an orientation mode, according to one or more examples of the present disclosure. The user interface may be presented to a user using a variety of display devices (e.g., screens, TVs, or monitors) and/or input/output (I/O) devices (e.g., touch screens, keypads, keyboards, etc.). The user interface 100 may present map data on a graphical user interface.

The user interface 100 may include a map data pane 102 and an information pane 104. The map data pane 102 may present map data. In the example user interface 100, the map data can include a plurality of icons 106 within a graphical representation of a map that represents the geographic area around where the user currently is and/or is currently navigating. The user interface 100 may present the map data in an animated fashion such that a user icon 106a (e.g., a chevron icon, diamond icon, vehicle icon, user silhouette, or the like) representing the user (or the user's means of transportation) moves on the map as a user's current position on the map changes (in near real time).

The map can also depict a variety of other icons that represent various real objects or features. For example, the map may include roads 106b, buildings 106c, rivers 106d, intersections 106e, and the like. The icons are depicted on the map with a configuration, orientation, and relationship between that substantially matches corresponding objects and features in the world.

As used herein, an "interface," "user interface," or "engagement interface" refers to an area, a boundary, or a place at which two separate and/or independent structures, members, apparatus, assemblies, components, and/or systems join, connect, are coupled, or meet and act on, or communicate, mechanically or electronically, with each other. In certain embodiments, "interface" may refer to a surface forming a common boundary of two bodies, spaces, structures, members, apparatus, assemblies, components, or phases. (search "interface" on Merriam-Webster.com. Merriam-Webster, 2021. Web. 15 Nov. 2021. Modified.) In certain embodiments, the term interface may be used with an adjective that identifies a type or function for the interface. For example, an engagement interface may refer to one or more structures that interact or connect to mechanically join or connect two separate structures, each connected to a side of the interface. In another example, a user interface may refer to one or more mechanical, electrical, or electromechanical structures that interact with or enable a user to provide user input, instructions, input signals, data, or data values and receive output, output data, or feedback.

In one embodiment, the map may also include icons 106 representing navigation objects and/or features. For example, the map may depict a route 106f from a starting point to a destination. The route 106f may include a completed route portion 106g (e.g., indicated in a solid line) and an uncompleted route portion 106h (e.g., indicated in a dashed or dotted line). The route 106f may include one or more waypoints indicated by corresponding waypoint icons 106i. The destination may be indicated by a destination icon 106j. In the illustrated embodiment, the map includes a representation and/or an icon of five-points intersection 106k. A five-points intersection 106k is a particular type of intersection having five roads or paths that connect at an intersection. Those of skill in the art will appreciate that other types of intersections, roadways, routes, walkways, and/or paths may be depicted and used in connection with the present disclosure. For example, a roundabout may be depicted on a map and may include a waypoint for a route.

"Route" refers to a predefined path or direction of travel and/or transport from a starting point to a destination point. A route may be made up of multiple sub-routes. A route may include a set of waypoints that may serve as intermediate stops and/or points of a change in direction or speed of a traveler on the route. A route may be over various terrain or within or over various mediums including air, space, and water. "Waypoint" refers to an intermediate point, location, or place on a route or line of travel and/or a stopping point or point at which a course is changed. A waypoint can refer to coordinates which identify a user's position on the globe at the end of each "leg" (stage) of a route. (Search "waypoint" on Wikipedia.com Oct. 14, 2021. CC-BY-SA 3.0 Modified. Accessed Feb. 3, 2022.) In certain examples, a point of origination and/or a destination may each be a particular type of waypoint.

The information pane 104 provides information to a user about the navigation along the route. While navigational systems can vary in what information the information pane 104 provides and when the information is provided, in the example embodiment the information pane 104 includes an estimated time of until arrival 108, miles per hour 110, orientation 112, and distance to destination 114.

The orientation 112 information of the information pane 104 indicates what orientation mode the user interface 100 and/or navigational system is using to present the map data.

In certain embodiments, the user interface 100 presents the current orientation mode in a user interface control such as a drop-down list 116. A user can change the orientation mode by selecting the drop-down list 116 and choosing another orientation mode from the list. In the example of FIG. 1A, the user interface 100 presents map data using a north up orientation mode. "North up" refers to an orientation mode for a navigational system, method, process, module, and/or apparatus in which a user interface displays navigational data such as icon, an image, a map, and/or map features within the user interface such that the top of the user interface aligns with a north compass direction (e.g., a cardinal direction) in relation to the navigational data. FIG. 1A indicates the north up orientation mode by presenting the icons on the user interface 100 in positions and orientations according to a top of the user interface 100 point in the north compass direction. The user interface 100 may also indicate the north up orientation mode by how a north direction icon 106*l* is oriented; the north direction icon 106*l* points towards the top of the map data pane 102.

Figure 1B:
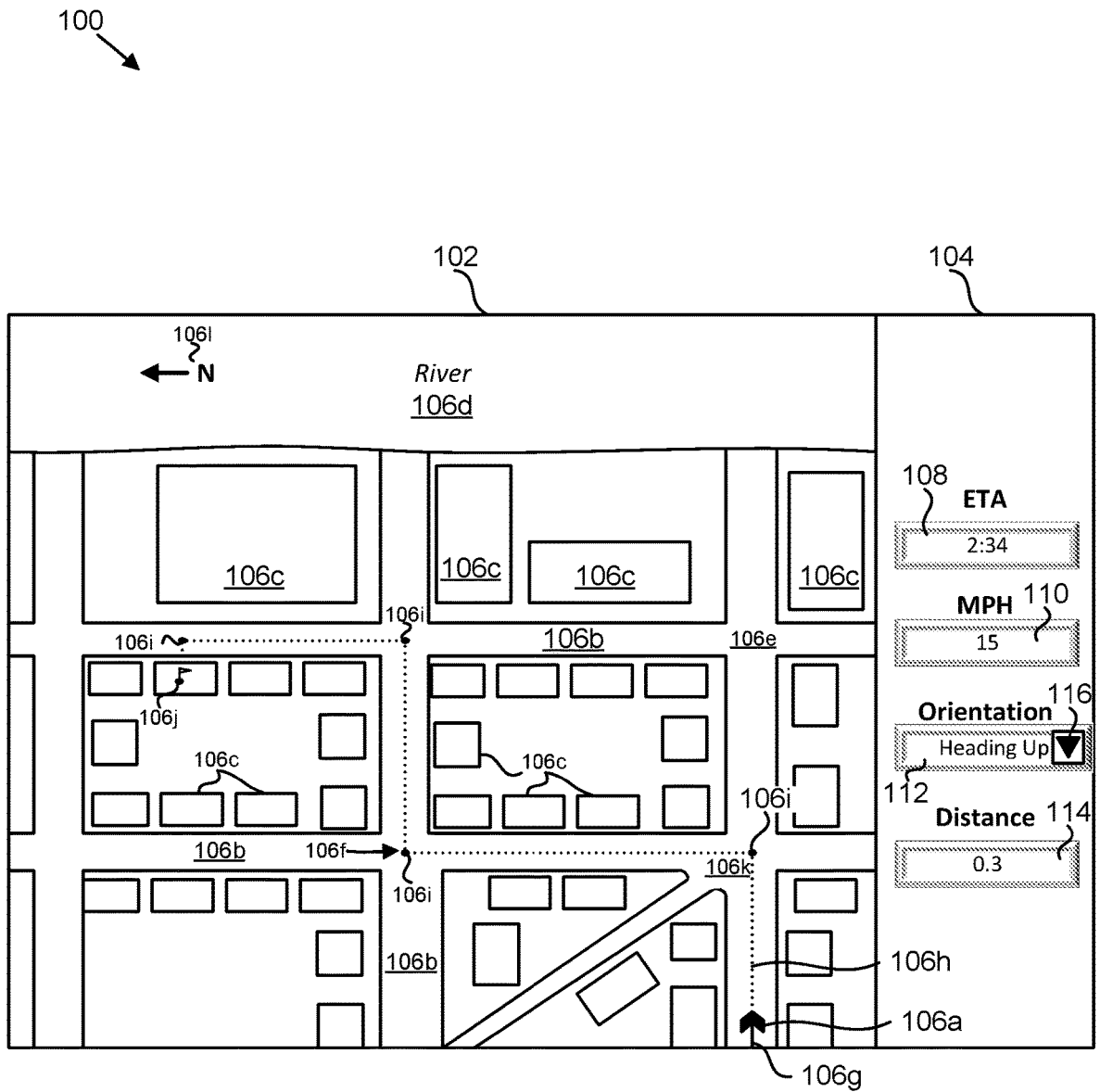
FIG. 1B depicts an example user interface that presents map data according to an orientation mode, according to one or more examples of the present disclosure.

Other orientation modes may be available to a user for use during navigation along a route. For example, a head up or heading up orientation and/or a course up navigation can be used. FIG. 1B depicts an example user interface that presents map data according to a heading up orientation mode, according to one or more examples of the present disclosure. "Head up" or "Heading up" refers to an orientation mode for a navigational system, method, process, module, and/or apparatus in which a user interface displays navigational data such as icon, an image, a map, and/or map features within the user interface such that the top of the user interface aligns with a direction or orientation of a front or head part of the user or of a vehicle the user is in in relation to the navigational data.

FIG. 1B depicts the same elements of FIG. 1A but reoriented and/or rearranged according to a heading up orientation mode. Comparing FIGS. 1A and 1B, differences between north up orientation mode and heading up orientation mode are readily apparent. For example, in FIG. 1A the river 106*d* is shown on the right hand side and in FIG. 1B the river 106*d* is shown at the top of the map data pane 102. In addition, north direction icon 106*l* continues to point north in FIG. 1B, but because of the change orientation mode to the heading up orientation mode the north direction icon 106*l* points to the left of the map data pane 102.

Of course, other orientation modes may be available to user of the user interface 100 and each of these is considered within the scope of the present disclosure. For example, a course up orientation mode may be used to present the map data. "Course" refers to the cardinal direction (e.g., North, South, East, West) that a person or vehicle should be steered towards. (Search "course" on Wikipedia.com Nov. 4, 2021. CC-BY-SA 3.0 Modified. Accessed Feb. 3, 2022.) "Course up" refers to an orientation mode for a navigational system, method, process, module, and/or apparatus in which a user interface displays navigational data such as icon, an image, a map, and/or map features within the user interface such that the top of the user interface aligns with and/or corresponds with a geographic position of a subsequent or final course waypoint displayed using the navigational data. While not illustrated in FIG. 1A or 1B, those of skill in the art will appreciate that a course up orientation mode depicted on map data pane 102 would include reorienting the icons 106 such that the top of the map data pane 102 points towards destination icon 106*j*.

Figure 2:
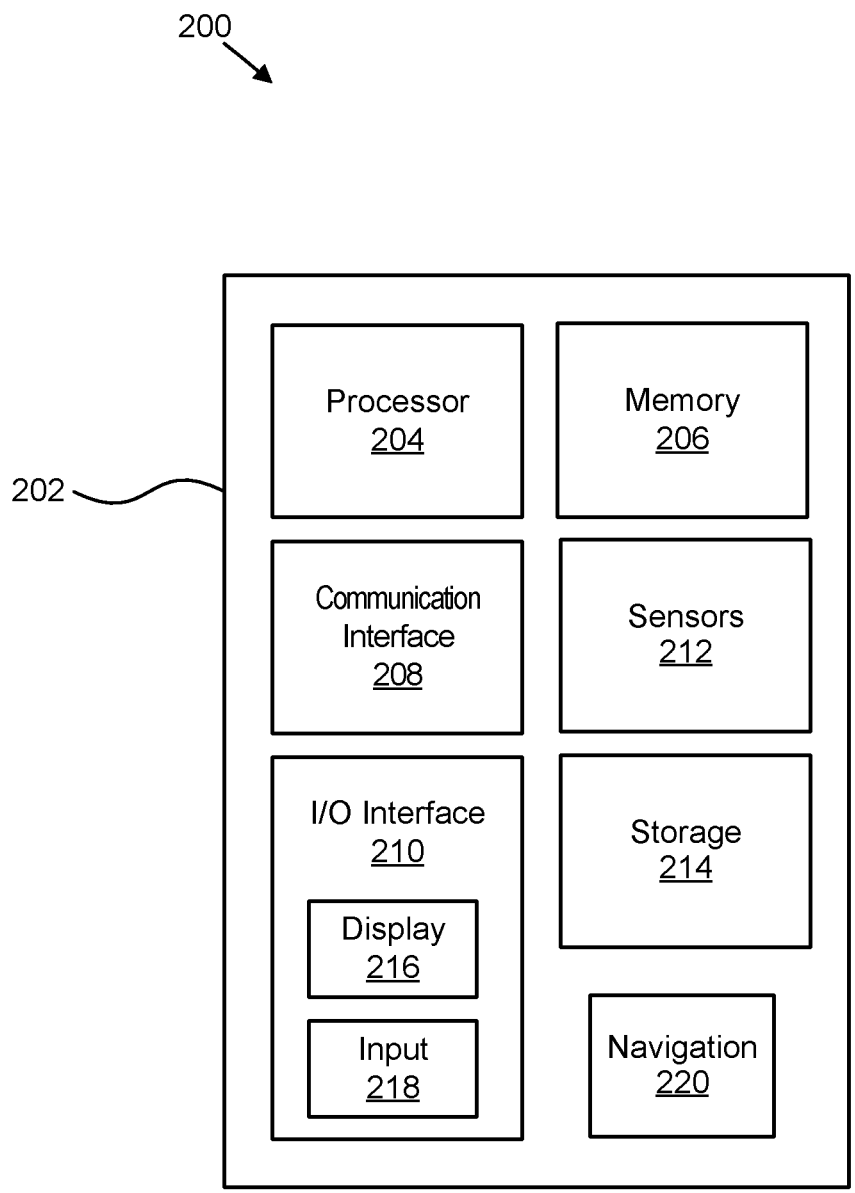
FIG. 2 is a schematic block diagram depicting an apparatus for setting an orientation mode, according to one or more examples of the present disclosure.

FIG. 2 is a schematic block diagram depicting an apparatus 200 for setting an orientation mode, according to one or more examples of the present disclosure.

For various of the navigation factors and/or parameters, the apparatus 200 may access and/or update device specific parameters for navigation module or navigation system that may include values, ranges, maximums, minimums, thresholds, matching values, categories, types, or expressions or combinations of the same, which are determined by an equipment manufacturer, software manufacturer, a user, or by machine learning based on optimization algorithms that may include usage information, quality information, and so forth. It may be noted that as used herein, the term "range" is used to refer to one or more values, ranges, maximums, minimums, thresholds, matching values, categories, types, or expressions or combinations of the same, or similar quantitative indicators. "Threshold" refers to a level, point, or value above which a condition is true or will take place and below which the condition is not true or will not take place, or vice versa. (Search "threshold" on Merriam-Webster.com. Merriam-Webster, 2019. Web. 14 Nov. 2019. Modified.)

In various examples, the apparatus 200 includes one or more instances of a computing device 202, such as for example, a portable electronic device such as a smartphone, a laptop, a tablet. The computing device 202 may include any one of a variety of other computing devices including personal computing devices and those used in vehicles including public transportation vehicles (e.g., busses, trains, airplanes, boats, and the like). The computing device 202 may include any computing device that includes or can be modified to include a navigation module, navigation system, and/or features of a navigational system.

In one or more examples, the apparatus 200 includes a processor 204, a memory 206 that is accessible by the processor 204, a communication interface 208, an I/O interface 210, sensors 212, and storage 214. It may be noted by a person of ordinary skill in the art that the apparatus 200 may include other components for performing various functions consistent with the type of computing device 202 being used (e.g., laptop, desktop, smart phone, tablet, vehicle navigation system, and so forth).

"Processor" refers to any circuitry, component, chip, die, package, or module configured to receive, interpret, decode, and execute machine instructions. Examples of a processor may include, but are not limited to, a central processing unit, a general-purpose processor, an application-specific processor, a graphics processing unit (GPU), a field programmable gate array (FPGA), Application Specific Integrated Circuit (ASIC), System on a Chip (SoC), virtual processor, processor core, and the like.

In some examples, the apparatus 200 utilizes the memory 206 to access program code and/or data. The memory 206 may include volatile and/or nonvolatile memory and may include memory that may be coupled or decoupled to the apparatus 200 such as a microSD card solid-state drive, or similar storage device. In various examples, the apparatus 200 may access memory 206 that is virtual memory stored in a storage area network, a remote server, cloud-based data storage, or other discrete or distributed network storage devices.

In various examples, the apparatus 200 includes a communication interface 208. The communication interface 208 may include hardware circuits and/or software (e.g., drivers, modem, protocol/network stacks) to support wired or wireless communication between the apparatus 200 and another device or network. The wireless connection may include a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

In some examples, the apparatus 200 includes an I/O interface 210 that is configured communicate with accessories, peripheral devices, input devices, output devices, and so forth. In certain examples, the I/O interface 210 may support various industry standards, such as for example, universal serial bus (USB), USB 2.0, USB 3.0, USB3Vision®, USB 3.1, USB 3.2, FireWire®, HMDI, CameraLink, GigE, and so forth which may be used to communicate with devices, peripherals, accessories, and so forth. The foregoing lists of interfaces with a wired or wireless is not intended to be an exhaustive list of the interfaces that may be used in implementing the apparatus 200 and is intended to show that certain interfaces can be used advantageously to implement the apparatus 200.

The I/O interface 210 may include or be in communication with a display device 216 and an input device 218. The display device 216 may include any device (e.g., screens, TVs, touch screens, or monitors) configured to present a user interface 100 to a user of the apparatus 200. The input device 218 may include any device (e.g., touch screens, keypads, keyboards, etc.) configured to accept and/or interpret user input.

"User input" refers to a form of input data that is provided directly or indirectly by a user, operator, or beneficiary of an apparatus, module, system, method, or process. User input can be provided by a variety of input devices and can include any indicator or indication of input data from the user. A variety of signals, indicators, indications, gestures, movements, touches, keystrokes, or the like can serve as user input. "Input data" refers to data identified, used, collected, gathered, and/or generated to serve as input to another component, circuit, driver, device, manager, control circuit, storage media, storage device, or controller. The input data can be in analog or digital format and can represent a data signal and/or one or more data values. As used herein, an "indicator" refers to an apparatus, device, component, system, assembly, mechanism, hardware, software, firmware, circuit, module, set of data, or logic structured, organized, configured, programmed, designed, arranged, or engineered to convey information or indicate a state, condition, context, location, or position to a user of a module, device or apparatus that includes, or is associated with the indicator. The indicator can include one or more of an audible signal, a tactile signal, a visual signal or indication, a visual marker, a visual icon, and the like.

"Display device" and/or "display" refers to any apparatus, device, component, module, circuit, sub-circuit, structure, electronic component, hardware, or logic configured, programmed, designed, arranged, or engineered to display, show, or present one or more visual images and/or videos to a user. A display device can use analog or digital technologies. Examples of a display device include one or more LEDs, a seven segment display, an LCD display, an LED display, and the like.

In various examples, the sensors 212 gather information about the environment in which the apparatus 200 operates. The apparatus 200, in certain examples, may not use sensors 212. In other examples, the apparatus 200 may use sensors 212 to determine changes in a context during navigation along a route. As used herein, a "sensor" refers to a device, component, circuit, system, chip, hardware, logic, or circuitry configured to detect, sense, and/or measure an attribute, feature, or characteristic of an environment, a space, a thing, an apparatus, a circuit, a component, and/or the like. Examples of a sensor include but are not limited to a speedometer, an accelerometer, a goniometer, a digital goniometer, a tiltmeter, an inclinometer, a potentiometer, a geomagnetic sensor, an acoustic sensor, a dynamic acceleration sensor, a dynamic acceleration sensor, a gyroscope, a temperature sensor, global positioning system, and the like.

In certain embodiments, a single sensor may detect, sense, and/or measure a single attribute, feature, or characteristic. In other embodiments, a single sensor may detect, sense, and/or measure a plurality of attributes, features, and/or characteristics. A sensor can be made up of analog, digital, electrical, mechanical, and/or electromechanical components and may function with or without an external power source. A sensor can employ a variety of technologies in order to detect, sense, and/or measure an attribute, feature, or characteristic. For example, certain sensors may use electronic signals, radio signals, electromagnetic signals, magnetic signals, light signals, sound signals, and the like. Certain sensors may include a receiver and/or a transmitter of signals or waves for performing the sensing feature. Often a sensor is configured to communicate information about a detected, sensed, and/or measured an attribute, feature, or characteristic to another electronic component or device. The information may be communicated using a wired connection or a wireless connection.

The apparatus 200 may include one or more sensors 212. Or, the apparatus 200 may use the communication interface 208 to communicate with one or more sensors separate from the apparatus 200.

The storage 214 may include one or more non-volatile storage devices that can store data for the apparatus 200. For example, the storage 214 may store map data, navigation data, position data, route data, user profile data, user preference data, and the like. "Non-volatile storage media" refers to any hardware, device, component, element, or circuit configured to maintain an alterable physical characteristic (deleted) used to represent a binary value of zero or one after a primary power source is removed. Non-volatile storage media may be used interchangeably herein with the term non-volatile memory media.

The apparatus 200 may include a navigation apparatus 220. The navigation apparatus 220 may take the form of a navigation system, a navigation module, a navigation circuit, navigation software, navigation firmware, or the like. The navigation apparatus 220 manages the navigation features of the apparatus 200 and outputs navigation information (e.g., map data) to a user.

In various examples, the memory 206 stores code executable by the processor 204 to set an orientation mode for a navigation system, navigation module, and/or navigation apparatus such as navigation apparatus 220. In various example implementations, the apparatus 200 sets an orientation mode using the processor 204 and the memory 206 which stores code that is executable by the processor to determine a context for a route to be navigated by a user. For example, in certain examples, the processor 204 may determine the context using data stored in the storage 214 and/or data provided by one or more sensors 212. In examples, the processor 204 may determine the context based on one or more factors that define the context. Determining the context may be performed by retrieving a data about context factors from storage 214 and/or from sensors 212. Alternatively, or in addition, determining the context may be performed by operating a machine learning or artificial intelligence module and/or a neural network that includes inputs that identify factors that define a context for a navigation.

"Context" refers to a frame of reference for an event, activity, statement, state, condition, action, and/or idea, and identifiable by a set of factors, conditions, and/or attributes that together can uniquely distinguish this event, activity, statement, state, condition, action, and/or idea from another. (Search "context" on wordhippo.com. WordHippo, 2022. Web. Accessed 3 Feb. 2022. Modified.) Often a context is defined by one or more factors, conditions, and/or attributes of the user or related to the user.

In one or more examples, the processor 204 determines an orientation mode for the context. Determining an orientation mode may be performed by retrieving a predefined orientation mode from storage 214 based on a context. Alternatively, or in addition, determining an orientation mode may be performed by operating a machine learning or artificial intelligence module and/or a neural network that includes inputs derived from a context for a navigation.

In one or more examples, the processor 204 sets an orientation mode for a navigation apparatus 220 to a first orientation mode based on the context. Setting an orientation mode may be performed by communicating a determined orientation mode to an I/O interface 210 such that map data pane 102 displays map data using the determined orientation mode. Alternatively, or in addition, setting an orientation mode may be performed by changing how display information is arranged before the display information is provided to the display device 216 by way of the I/O interface 210.

Figure 3:
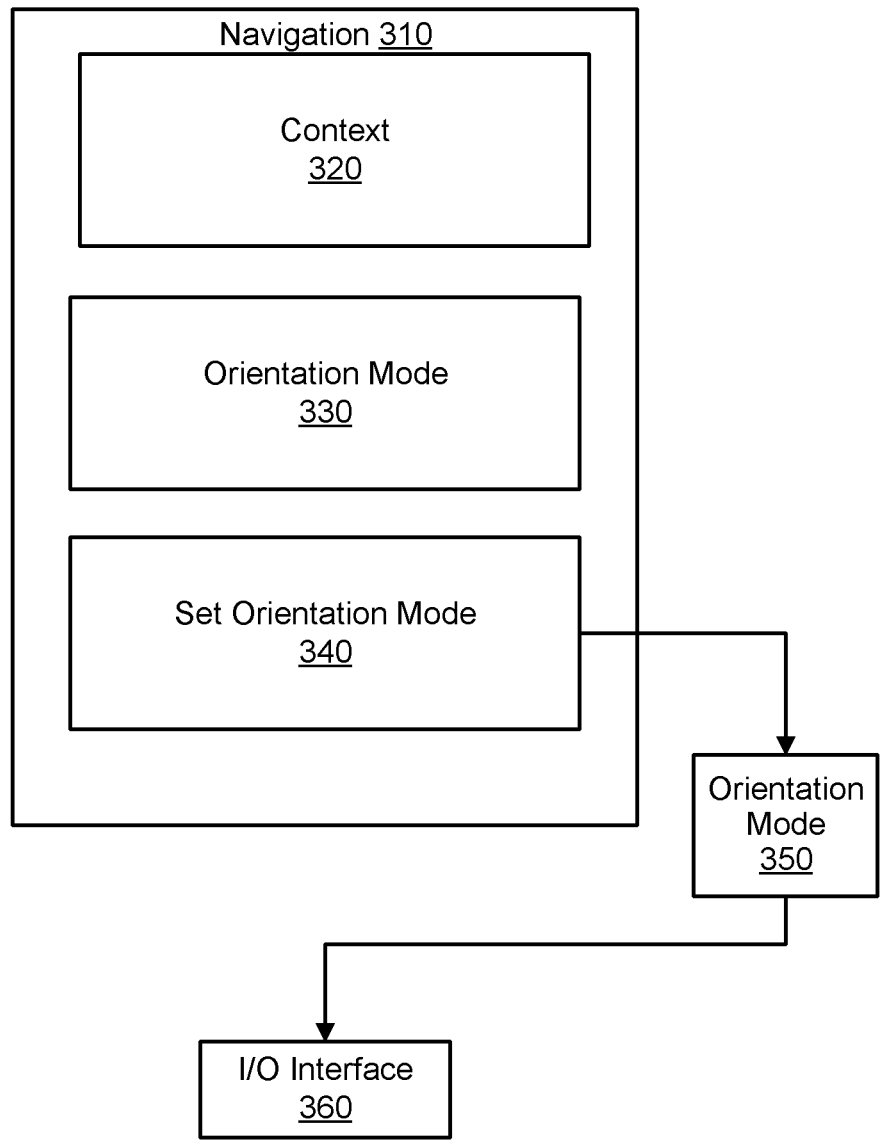
FIG. 3 is a schematic block diagram depicting an apparatus for setting an orientation mode, according to one or more examples of the present disclosure.

FIG. 3 is a schematic block diagram depicting a navigation system 300 for setting an orientation mode, according to one or more examples of the present disclosure. In one embodiment, the navigation system 300 includes a navigation module 310. The navigation module 310 may include a context module 320, an orientation mode module 330, and a set orientation mode module 340.

The context module 320 determines a context for a route to be navigated by a user. The context module 320 may evaluate a number of factors to determine the context. In certain embodiments, the context may be predefined and/or may be set by the user of the navigation system 300. In another embodiment, the context may be a default context predefined to serve as the context if no other factors indicate that another context should be associated with the route and/or the user.

The orientation mode module 330 determines an orientation mode for a context. In one embodiment, the orientation mode module 330 determines an orientation mode for the context determined by the context module 320. The orientation mode module 330 may determine the orientation mode in a number of ways. In one example, orientation mode module 330 may retrieve a stored orientation mode associated with a context. The stored orientation mode associated with a context may be stored in a repository such as a file or a database. The repository may reside within the navigation system 300 or may reside separate from the navigation system 300.

The set orientation mode module 340 may set an orientation mode for a navigation system, such as navigation system 300, to a first orientation mode (e.g., North Up, Heading Up, Course Up, etc.) based on the context determined by the context module 320. The set orientation mode module 340 may set the orientation mode in a number of ways. In one example, the set orientation mode module 340 may send an orientation mode message 350. The orientation mode message 350 may be a signal, communication, or other instruction that can be understood by another component, module, system, or subsystem of the navigation system 300 such that the user interface 100 presents map data using the orientation mode. Alternatively, or in addition, the set orientation mode module 340 may change a configuration setting or other data value in the navigation system 300 such that the first orientation mode is used to present map data to a user. In certain embodiments, the set orientation mode module 340 may communicate directly with an I/O interface 360 to cause the I/O interface 360 to use the first orientation mode. The I/O interface 360 may be similar to the I/O interface 210.

Figure 4:
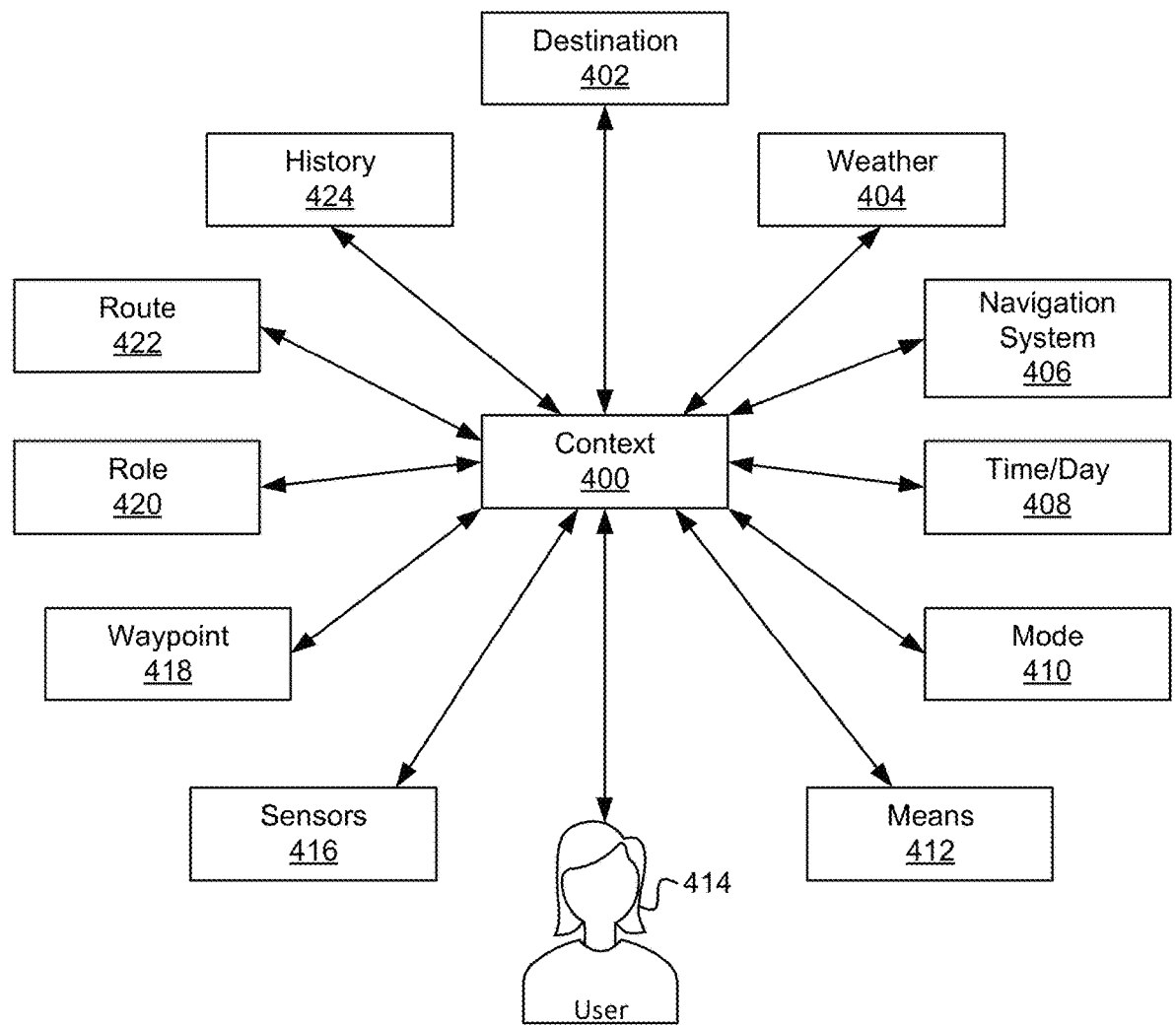
FIG. 4 depicts a context and examples of factors that can be used to define a context, according to one or more examples of the present disclosure.

FIG. 4 depicts a context and examples of factors that can be used to define a context 400, according to one or more examples of the present disclosure. "Factor" refers to an element or circumstance contributing to a result. (Search "factor" on wordhippo.com. WordHippo, 2022. Web. Accessed 4 Feb. 2022.) Certain factors may be static and not change over time. Other factors may be dynamic and may change over time, as a user travels the route, or based on other circumstances or attributes. This means that the context 400 may be dynamic and may change over time. Thus, a single orientation mode may be appropriate and serve the user best along an entire route. Alternatively, or in addition, an orientation mode originally used at the start of a route may be changed automatically by the navigation apparatus 220, navigation system 300 and/or navigation module 310 as a user navigates the route.

In addition, not all factors may have the same level of importance or "weight" in defining a context 400. This feature of context may readily facilitate use of machine learning or artificial intelligence algorithms, such as neural networks, in determining either the context 400, a suitable orientation mode, or both. Consequently, in certain embodiments, a navigation apparatus 220 and/or context module 320 may use machine learning and/or artificial intelligence systems to determine the context 400 and/or orientation mode. In certain embodiments, a navigation apparatus 220 and/or context module 320 may use one or more, or any combination of factors to determine a context 400.

As explained above a context is a frame of reference for a navigation along a route by the user. Those of skill in the art will appreciate that a number of factor may be involved in determining a context for the navigation. FIG. 4 illustrates just a few examples.

In one example, the context 400 may be influenced by a destination factor 402. The destination factor 402 is a factor that is based on the type of destination for the route. The degree to which the destination factor 402 defines or influences the context 400 can be predefined based on a set of default destination types. Alternatively, or in addition, the degree to which the destination factor 402 defines or influences the context 400 can be set, determined, or adjusted by a user. In one embodiment, if the destination for the route is a user's home, a user's workplace, or the like, the destination factor 402 may have a higher influence than if the destination for the route is of an unknown destination type. In one embodiment, a context for a user's home may be context associated with a heading up orientation mode.

In one example, the context 400 may be influenced by a weather factor 404. The weather factor 404 is a factor that is based on the type of weather experienced by a user along the route. The degree to which the weather factor 404 defines or influences the context 400 can be predefined based on a set of default weather types. Alternatively, or in addition, the degree to which the weather factor 404 defines or influences the context 400 can be set, determined, or adjusted by a user. In one embodiment, if the type of weather experienced by a user along the route is rainy, snowing, or high winds, the weather factor 404 may have a higher influence than if the weather is sunny and warm as a user travels along the route. In one embodiment, an orientation mode for a context having rainy, snowing, or high winds for a particular user may be heading up orientation mode because the user may navigate more accurately and quickly using heading up orientation mode and can get to the destination more quickly.

In one example, the context 400 may be influenced by a navigation system factor 406. The navigation system factor 406 is a factor that is based on the type of navigation system being used by the user for the navigation. Specifically, if the navigation system is one implemented using a handheld or portable device the navigation system factor 406 may have a first weight and/or preference for a certain orientation mode. Alternatively, or in addition, if the navigation system is a single purpose navigation system built into a vehicle or public transport, for example, the navigation system factor 406 may have a second weight and/or preference for a certain orientation mode.

The degree to which the navigation system factor 406 defines or influences the context 400 can be predefined based on a set of default navigation system types. Alternatively, or in addition, the degree to which the navigation system factor 406 defines or influences the context 400 can be set, determined, or adjusted by a user. In one embodiment, if the navigation system is a system integrated into a public train, the navigation system factor 406 may have a lower influence than if the navigation system is a system implemented using a portable device owned by the user. In one embodiment, an orientation mode for a navigation system on a portable electronic device of the user for a particular user may be heading up orientation mode because the user has more control of the navigation and can alter the route more readily.

In one example, the context 400 may be influenced by a time/day factor 408. The time/day factor 408 is a factor that is based on one, or the other, or both, a time of day and a day of the month or year for the navigation. Specifically, if a user is navigating on a weekend, weekday, holiday, or important day for the user the time/day factor 408 may have a first weight and/or preference for a certain orientation mode. Alternatively, or in addition, if the user is navigating within a brief time window before a time for an appointment on the user's calendar, for example, the time/day factor 408 may have a second weight and/or preference for a certain orientation mode.

The degree to which the time/day factor 408 defines or influences the context 400 can be predefined based on a set of default time/day situations. Alternatively, or in addition, the degree to which the time/day factor 408 defines or influences the context 400 can be set, determined, or adjusted by a user. In one embodiment, if user is navigating on a weekend and events are coming due on the user's calendar, the time/day factor 408 may have a lower influence than if the user is navigating on an important anniversary date.

In one example, the context 400 may be influenced by a mode of transport factor 410. The mode of transport factor 410 is a factor that is based on the mode of transport a user is using for the navigation.

"Mode of transport" refers to a way, or how, a person or cargo is transported. Examples of modes of transport include air, water, land, space, animal powered, and human powered, including walking, running, or crawling. (Search "mode of transport" on Wikipedia.com Feb. 7, 2021. CC-BY-SA 3.0 Modified. Accessed Feb. 9, 2022.) Examples of means of transportation include vehicles, systems, or apparatus, for moving a person or cargo in, through, using, or over a variety of mode of transport, such as ships, aircraft, spacecraft, land vehicles, wagons, carts, bicycles, and the like.

Specifically, if a user is navigating using human power, for example walking, running, skating, or bicycling the mode of transport factor 410 may have a first weight and/or preference for a certain orientation mode. Alternatively, or in addition, if the user is navigating using a motorized mode of transport, for example, the mode of transport factor 410 may have a second weight and/or preference for a certain orientation mode.

As with the other factors, the degree to which the mode of transport factor 410 defines or influences the context 400 can be predefined based on a set of default modes of transport. Alternatively, or in addition, the degree to which the mode of transport factor 410 defines or influences the context 400 can be set, determined, or adjusted by a user.

In one example, the context 400 may be influenced by a means of transport factor 412. The means of transport factor 412 is a factor that is based on the means of transport a user is using for the navigation.

"Means of transportation" refers to any transport apparatus, device, system, module, vehicle, process, or the like used to carry people or cargo from a point of origination to a destination. (Search "means of transportation" on Wikipedia.com Oct. 19, 2021. CC-BY-SA 3.0 Modified. Accessed Feb. 9, 2022.) Examples of means of transportation include vehicles, systems, or apparatus, for moving a person or cargo in, through, using, or over a variety of mode of transport, such as ships, aircraft, spacecraft, land vehicles, wagons, carts, bicycles, and the like.

Specifically, if a user is navigating using an aircraft, for example, a commercial aircraft the means of transport factor 412 may have a first weight and/or preference for a certain orientation mode. Alternatively, or in addition, if the user is navigating using a motorcycle, for example, the means of transport factor 412 may have a second weight and/or preference for a certain orientation mode.

As with the other factors, the degree to which the means of transport factor 412 defines or influences the context 400 can be predefined based on a set of default modes of transport. Alternatively, or in addition, the degree to which the means of transport factor 412 defines or influences the context 400 can be set, determined, or adjusted by a user.

In one example, the context 400 may be influenced by a user factor 414. The user factor 414 is a factor that is based on the particular user using for the navigation system, apparatus, or module.

Specifically, if a particular user is navigating the user factor 414 may have a first weight and/or preference for a certain orientation mode. Alternatively, or in addition, if a different user is navigating, for example, the user factor 414 may have a second weight and/or preference for a certain orientation mode. As with the other factors, the degree to which the user factor 414 defines or influences the context 400 can be predefined based on a set of default settings. Alternatively, or in addition, the degree to which the user factor 414 defines or influences the context 400 can be set, determined, or adjusted by a user.

In one example, the context 400 may be influenced by a sensors factor 416. The sensors factor 416 is a factor that is based on sensors available to a navigation system, apparatus, or module. Examples of the sensors may include a speedometer, a GPS sensor, a time sensor (for example, a clock, a timer, or a counter), a temperature sensor, a light sensor, and the like.

Specifically, if a particular user is navigating the route at an unusually slow speed, the sensors factor 416 may have a first weight and/or preference for a certain orientation mode. Alternatively, or in addition, if a user is navigating at a high rate of speed, for example, the sensors factor 416 may have a second weight and/or preference for a certain orientation mode. As with the other factors, the degree to which the sensors factor 416 defines or influences the context 400 can be predefined based on a set of default settings. Alternatively, or in addition, the degree to which the sensors factor 416 defines or influences the context 400 can be set, determined, or adjusted by a user.

In one example, the context 400 may be influenced by a waypoint factor 418. The waypoint factor 418 is a factor that is based on type of waypoint a user arrives at, approaches, or departs from, as the user navigates the route. Examples of the waypoints include an intersection with traffic lights, a roundabout intersection, a five-points intersection 106k (See FIG. 1), a stop along the route to the destination, a one-way intersection, a transfer point from one means or mode of transport to another, and the like.

Specifically, if a particular user is navigating the route and approaches a five-points intersection 106k, the waypoint factor 418 may have a first weight and/or preference for a certain orientation mode. Alternatively, or in addition, if a user is navigating at a roundabout intersection, for example, the waypoint factor 418 may have a second weight and/or preference for a certain orientation mode. As with the other factors, the degree to which the waypoint factor 418 defines or influences the context 400 can be predefined based on a set of default settings. Alternatively, or in addition, the degree to which the waypoint factor 418 defines or influences the context 400 can be set, determined, or adjusted by a user.

In one example, the context 400 may be influenced by a role factor 420. The role factor 420 is a factor that is based on what role a user has while navigating the route. "Role" refers to a specific duty, job, task, function, or obligation or a person, system, module, or apparatus. Examples of the roles include passenger, driver, pilot, captain, navigator, and the like.

Specifically, if a user is navigating the route as a driver, the role factor 420 may have a first weight and/or preference for a certain orientation mode. Alternatively, or in addition, if a user is navigating as a passenger, for example, the role factor 420 may have a second weight and/or preference for a certain orientation mode. As with the other factors, the degree to which the role factor 420 defines or influences the context 400 can be predefined based on a set of default settings. Alternatively, or in addition, the degree to which the role factor 420 defines or influences the context 400 can be set, determined, or adjusted by a user.

In one example, the context 400 may be influenced by a route factor 422. The route factor 422 is a factor that is based on a particular route for the navigation. Certain routes may take the fastest most efficient route from the point of origin to the destination. Other routes may include multiple waypoints, travel to points that increase the length of time or distance for the route, and the like.

Specifically, if a user defines a route for the navigation that is the shortest and most efficient, the route factor 422 may have a first weight and/or preference for a certain orientation mode. Alternatively, or in addition, if a user defines a route for the navigation that is the longest and most time consuming, for example, the route factor 422 may have a second weight and/or preference for a certain orientation mode. As with the other factors, the degree to which the route factor 422 defines or influences the context 400 can be predefined based on a set of default settings. Alternatively, or in addition, the degree to which the route factor 422 defines or influences the context 400 can be set, determined, or adjusted by a user.

In one example, the context 400 may be influenced by a history factor 424. The history factor 424 is a factor that is based on how often a user has taken a particular route, included a particular waypoint along the route, visited a particular destination, and/or been to a locale that includes the route. The history factor 424 may be referred to as a navigation history or visit history. "Navigation history" or "visit history" refers to a set of data that identifies one or more places, waypoints, or locations, a person or user has visited and/or navigated through or to, in the past. "Locale" refers to a specific location and the areas immediately surrounding the specific location. Often a locale has a particular set of attributes that may relate to its geography, scenery, climate, or the like. Data for the history factor 424 may be stored by a navigation apparatus 220 in storage 214. The history factor 424 can include whether or not a user has visited a locale and/or how often a user has visited a locale, waypoint, or taken a particular route.

Specifically, if a user has navigated through a particular five-points intersection 106k over five hundred times, the history factor 424 may have a first weight and/or preference for a certain orientation mode. Alternatively, or in addition, if a user navigates to a particular locale for the first time, for example, the history factor 424 may have a second weight and/or preference for a certain orientation mode. As with the other factors, the degree to which the history factor 424 defines or influences the context 400 can be predefined based on a set of default settings. Alternatively, or in addition, the degree to which the history factor 424 defines or influences the context 400 can be set, determined, or adjusted by a user.

Figure 5:
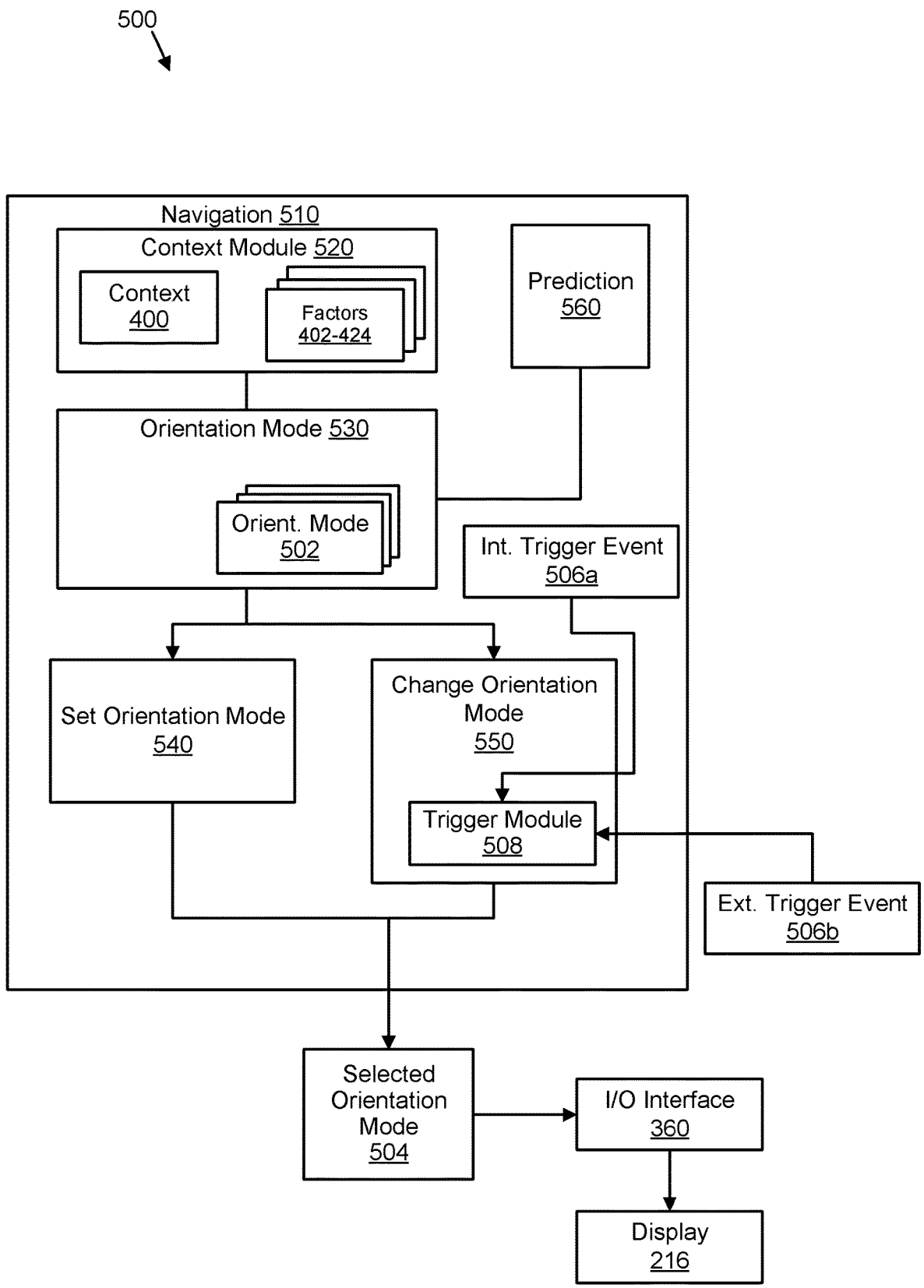
FIG. 5 depicts a system for setting an orientation mode, according to one or more examples of the present disclosure.

FIG. 5 depicts a system 500 for setting an orientation mode, according to one or more examples of the present disclosure. FIG. 5 may include similar modules, code, components, parts, devices, apparatus, features, and aspects as those disclosed and described in relation to FIGS. 3 and 4, however the members of the system 500 may include additional and/or alternative modules, code, components, parts, devices, apparatus, features, and aspects. Accordingly, the system 500 includes a navigation module 510, a context module 520, an orientation mode module 530, and a set orientation mode module 540. Alternatively, or in addition, the system 500 may also include a change orientation mode module 550 and/or a prediction module 560.

Among one or more of its other features, functions, aspects and attributes, the navigation module 510 manages an orientation mode for the system 500. In other words, the navigation module 510 manages a contextual navigation direction orientation used in presenting information to a user. "Contextual navigation direction orientation" refers generally to features, functions, methods, apparatuses, devices, circuits, modules, components, firmware, and/or software configured to manage an orientation for navigational direction information based on a context for the navigation.

To manage the orientation mode, the system 500 may use the context module 520. The context module 520 determines a context 400 for a route to be navigated by a user. As discussed above, the context module 520 may reference one or more factors (e.g., example factors 502-524) to determine the context 400. Determining a particular context 400 and/or orientation mode may include evaluating certain weights or priorities for the factors. Alternatively, or in addition, a user may indicate a preference or set a parameter that identifies a particular context 400 for a given set of one or more factors or as a default context.

The context module 520 may coordinate with the orientation mode module 530 to determine an orientation mode for particular context 400. In certain embodiments, the context module 520 may determine an orientation mode from a set of orientation modes 502. Examples of orientation modes that may be part of the set of orientation modes 502 include a north up orientation mode, heading up orientation mode, course up orientation mode, and the like. In certain embodiments, the context 400 determined may be associated with a particular orientation mode. Alternatively, or in addition, one or more sets of contexts 400 may be associated with one or more orientation modes. The relationship between a context 400 and an orientation mode may be determined algorithmically or by way of retrieving an orientation mode associated with a context 400 using a repository.

"Repository" refers to any data source or dataset that includes data or content. In one embodiment, a repository resides on a computing device. In another embodiment, a repository resides on a remote computing or remote storage device. A repository may comprise a file, a folder, a directory, a set of files, a set of folders, a set of directories, a database, an application, a software application, content of a text, content of an email, content of a calendar entry, and the like. A repository, in one embodiment, comprises unstructured data. A repository, in one embodiment, comprises structured data such as a table, an array, a queue, a look up table, a hash table, a heap, a stack, or the like. A repository may store data in any format including binary, text, encrypted, unencrypted, a proprietary format, or the like.

The orientation mode module 530 may coordinate with one of the set orientation mode module 540 and the change orientation mode module 550 to set an orientation mode for the navigation module 510. When the navigation module 510 is first initiated to assist a user with navigation, the navigation module 510 may use the set orientation mode module 540 to set the orientation mode for navigation module 510 to a determined orientation mode (e.g., a first orientation mode) provided by the orientation mode module 530. The set orientation mode module 540 may provide a selected orientation mode 504 to an I/O interface 210 or I/O interface 360. The I/O interface 360 may provide map data on a display device 216 according to the selected orientation mode 504.

When the navigation module 510 is operating to assist a user with navigation, the navigation module 510 may use the change orientation mode module 550 to change the orientation mode for navigation module 510 from a current, or first, orientation mode to another, or second, orientation mode provided by the orientation mode module 530. The change orientation mode module 550 may operate in response to various inputs, prompts, states, and/or conditions as a user navigates a route. In one embodiment, the change orientation mode module 550 may operate in response to a change in one of the factors that influenced the context 400. In another embodiment, the change orientation mode module 550 may operate in response to a trigger event 506.

A "trigger" or "trigger event" may refer to any suitable event, condition, circumstance, and/or set of circumstances or change therein for which a monitor, listener, or receiver is configured to respond to based on such event, change, and/or set of circumstances. Examples trigger events include, but are not limited to, internal trigger events, external trigger events, milestone trigger events, and the like among other events and/or circumstances that are possible and contemplated herein.

In the illustrated embodiment, the change orientation mode module 550 may include a trigger module 508 that awaits trigger events. In certain embodiments, the trigger module 508 listens for trigger events. The trigger module 508 may monitor one or more factors, aspects, sensors, and/or other parameters to determine when a trigger event 506 happens. The trigger module 508 is configured to detect the trigger event 506 and initiate a response to the trigger event 506. In certain embodiments, the trigger module 508 may activate the context module 520 to determine a new context 400 and/or the trigger module 508 may activate the orientation mode module 530 to determine a new orientation mode in response to one or more trigger events 506.

In the illustrated embodiment, the trigger events 506 can be internal trigger events 506a or internal trigger events 506a. Internal trigger events 506a may be trigger events that are caused by factors, attributes, parameters, or characteristics that can be monitored, tracked, and/or sensed by the navigation module 510. External trigger events 506b may be trigger events that are not caused by factors, attributes, parameters, or characteristics that can be monitored, tracked, and/or sensed by the navigation module 510.

Those of skill in the art will appreciate that various examples of internal trigger events 506a and/or external trigger events 506b may exist each of which is within the scope of the present disclosure. In one example, an internal trigger event 506a may be created, or triggered, when a user approaches a particular waypoint or type of waypoint (e.g., within x feet of the waypoint). In another example, an internal trigger event 506a may be created, or triggered, when a user leaves a particular waypoint or type of waypoint (e.g., beyond x feet of the waypoint).

In another example, an internal trigger event 506a may be created, or triggered, when there is a change in one or more factors that were used to define the context 400. For example, a change in the weather, a change in the role of the user, a change in the route, a revised route, a change in the mode of transportation, or the like.

In still another example, an internal trigger event 506a may be created, or triggered, when user input is received relating to orientation mode. For example, referring to FIG. 1A, a user may provide user input by activating drop-down list 116 and selecting a different orientation mode than a current orientation mode. In this example, a user may select a Heading Up orientation as their desired orientation mode rather than a North Up orientation mode. Such use input may trigger an internal trigger event 506a and the trigger module 508 may coordinate with the context module 520, orientation mode module 530, and/or change orientation mode module 550 to effectuate the change.

In certain embodiments, certain internal trigger events 506a such as receiving user input indicating a different desired orientation mode may lead to other changes in the behavior of the navigation module 510. In one example, a single internal trigger event 506a that is user input indicating a different desired orientation mode may cause the navigation module 510 to change an orientation mode associated with a current context 400 to change the orientation mode to the orientation mode indicated by the user input.

For example, the change orientation mode module 550 may instruct the orientation mode module 530 to change the association between the orientation mode and the context, such that the orientation mode associated with the context is the orientation mode indicated by the user input. In response, the change orientation mode module 550 may update a repository record that records the association between the and the orientation mode to be the orientation mode indicated by the user input. Consequently, the orientation mode used the next time the user navigates in the context is the orientation mode to be the orientation mode indicated by the user input. "Association" refers to a relationship between one set of data or one object and another set of data, indicator, or object. In certain examples, an association can relate to pieces of data. The association can be defined by or captured using another indicator, a link, a tag, and/or a structural relationship between a first set of data and a second set of data.

In certain embodiments, before the navigation module 510 changes an association between an orientation mode and a context, the navigation module 510 may prompt the user for confirmation that the user wants to change the association between the context and an orientation mode to the orientation mode indicated by the user input. "Confirmation" refers to a form of user input that communicates agreement of a user with the information, assertion, or plan presented to the user. The user may provide the confirmation or decline to provide the confirmation, and the navigation module 510 may respond accordingly.

In one embodiment, the change orientation mode module 550 may be configured to maintain one or more frequency metrics for a particular trigger event 506 or set of trigger events 506 that result in a change of the orientation mode from a current orientation mode to a different orientation mode. The trigger event 506 tracked using frequency metrics may be internal trigger events 506a and/or external trigger events 506b. "Metric" refers to any unit of measure for a particular quantity, trait, attribute, feature, and/or aspect. A metric can include any unit or system of measure based on the type of metric that is tracked, recorded, monitored, or measured. A metric can be measured in whole numbers, decimal numbers, fractions, or the like. In certain embodiments, the term metric may be used with an adjective that identifies the metric being tracked, recorded, monitored, or measured. For example, a "frequency metric" may refer to metric for a frequency of an event, action, and/or condition, or the like.

When a frequency metric satisfies one or more thresholds, the change orientation mode module 550 may cause a different orientation mode to be associated with the context rather than an orientation mode currently associated with the context. Thus, the different orientation mode will be used on a subsequent navigation by the user for the context. In this manner, the navigation module 510 can be configured to learn which orientation modes are most preferred by a user. The navigation module 510 can adapt to the needs, interests, and/or preferences of the user.

One example of an external trigger event 506b may be when a user leaves or departs from the route being used for the navigation. Of course, a user may depart from a route for a variety of reasons. One reason may be because the user has lost their way during the navigation. One aspect that might contribute to a user losing their way may be because the user interface 100 may be using an orientation mode that is not optimal for this user and/or this context. The act of a user departing from the route may trigger an external trigger event 506b. In response to this event, the change orientation mode module 550 may change the orientation mode that may prove more helpful to a user who is lost. For example, where a user is hiking in a forest during daylight, the change orientation mode module 550 may change the orientation mode to North Up orientation mode to help the user get their bearings.

One example of an external trigger event 506b may be when a user proactively changes a navigation route to an alternative route. For example, the user may change a route from a fastest and most efficient route to an alternative route that takes longer but includes sightseeing waypoints. In response to this external trigger event 506b, the change orientation mode module 550 may change the orientation mode to facilitate sightseeing (e.g., to a Heading Up orientation mode).

In certain embodiments, the navigation module 510 may include a prediction module 560. The prediction module 560 may coordinate with the orientation mode module 530 to facilitate determining the orientation mode 502. Alternatively, or in addition, the prediction module 560 may coordinate with the context module 520 to facilitate determining the context 400 and/or in evaluating the factors. In certain embodiments, the prediction module 560 may coordinate with the change orientation mode module 550 to change an orientation mode, and/or manage, and/or respond to trigger events 506.

The prediction module 560 may use advanced computer analysis, machine learning, and/or automated/artificial intelligence to enhance determination of a context 400, evaluation of factors, determining an orientation mode, managing trigger events 506, changing an orientation mode, and the like. hat a more desirable outcome is achieved. The prediction module 560 may implement, or use, a neural network configured according to the training such that as the prediction module 560 is able to recommend or predict a suitable context 400, orientation mode, change in orientation mode, or the like.

"Artificial intelligence" refers to intelligence demonstrated by machines, unlike the natural intelligence displayed by humans and animals, which involves consciousness and emotionality. The distinction between artificial intelligence and natural intelligence categories is often revealed by the acronym chosen. 'Strong' AI is usually labelled as artificial general intelligence (AGI) while attempts to emulate 'natural' intelligence have been called artificial biological intelligence (ABI). Leading AI textbooks define the field as the study of "intelligent agents": any device that perceives its environment and takes actions that maximize its chance of achieving its goals. The term "artificial intelligence" can also be used to describe machines that mimic "cognitive" functions that humans associate with the human mind, such as "learning" and "problem solving". (Search "artificial intelligence" on Wikipedia.com Jun. 25, 2021. CC-BY-SA 3.0 Modified. Accessed Jun. 25, 2021.)

Figure 6:
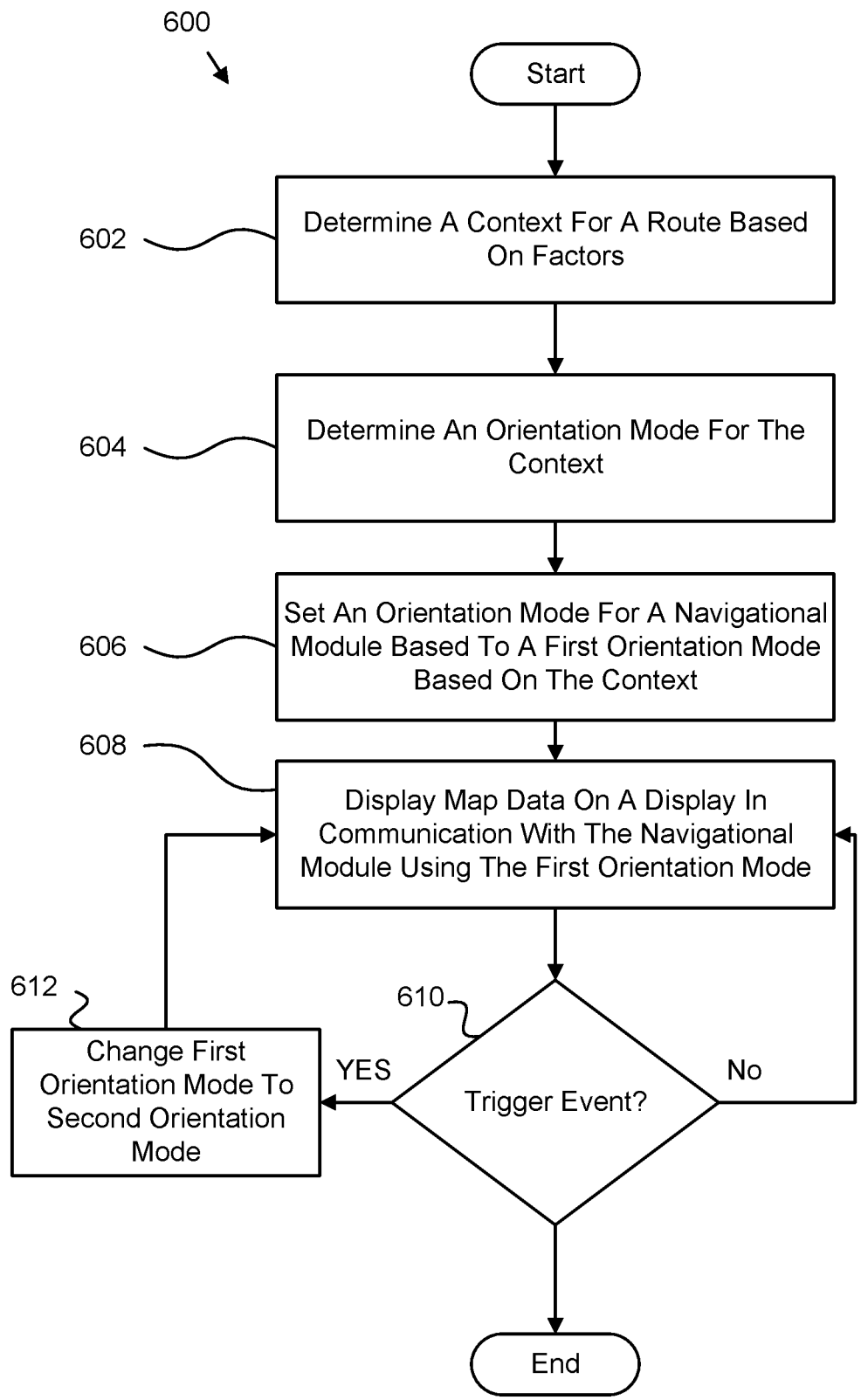
FIG. 6 is a schematic flow chart diagram illustrating a method for setting an orientation mode, according to one or more examples of the present disclosure.

FIG. 6 is a schematic flow chart diagram illustrating a method 600 for setting an orientation mode, according to one or more examples of the present disclosure. In various examples, the method 600 begins and includes determining 602 a context for a route to be navigated by a user based on one or more factors. In certain examples, the method 600 continues and includes determining 604 an orientation mode for the context. In one or more examples, the method 600 further includes setting 606 an orientation mode for a navigation module to a first orientation mode based on the determined context. In one or more examples, the method 600 further includes displaying 608 map data on a display in communication with the navigation module using the first orientation mode.

In one example, the method 600 may further include determining 610 whether a trigger event 506 has occurred. If not, the method may return to displaying 608 map data on a display in communication with the navigation module using the first orientation mode. If so, the method 600 may continue by changing 612 the orientation mode for the navigation module from the first orientation mode to a second orientation mode in response to a trigger event.

In certain examples, where the trigger event 506 includes user input identifying a second orientation mode, the method 600 may continue by changing the orientation mode associated with the context such that the second orientation mode is used for the context on a subsequent navigation. In certain examples, where the trigger event 506 include user input identifying a second orientation mode and a frequency metric is satisfied, the method 600 may continue by changing the orientation mode associated with the context such that the second orientation mode is used for the context on a subsequent navigation. In certain examples, a trigger event 506 may not cause a change in the orientation mode, in such a case, the method 600 may return to displaying 608 map data on a display in communication with the navigation module using the first orientation mode.

In various examples, the method 600 may be implemented substantially as described above with respect to the functions of the apparatus 200, navigation system 300, and system 500, respectively in FIGS. 2, 3, and 5.

Figure 7:
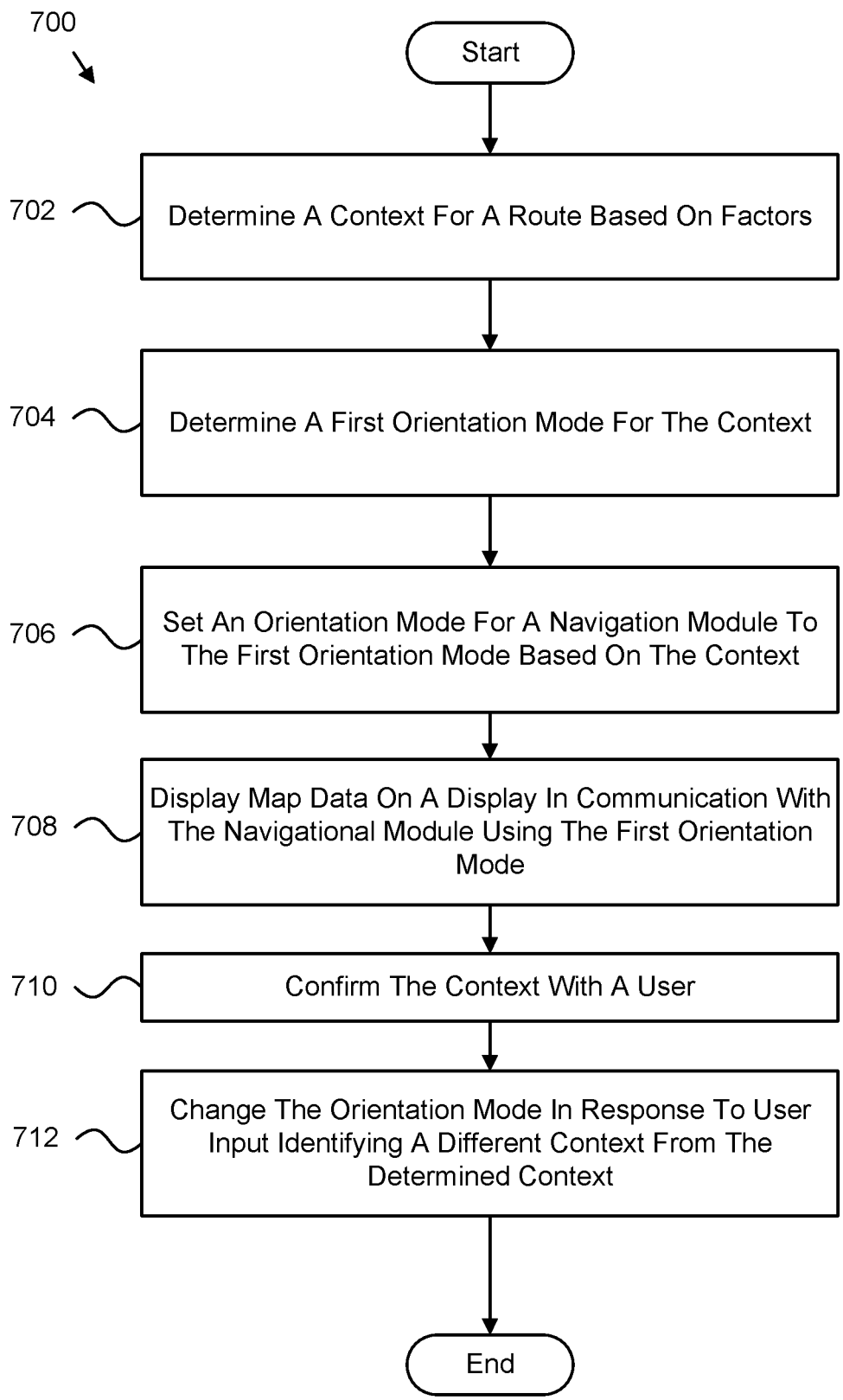
FIG. 7 is a schematic flow chart diagram illustrating another method for setting an orientation mode, according to one or more examples of the present disclosure.

FIG. 7 is a schematic flow chart diagram illustrating another method for setting an orientation mode, according to one or more examples of the present disclosure. In various examples, the method 700 begins and includes determining 702 a context for a route to be navigated by a user based on one or more factors. In certain examples, the method 700 continues and includes determining 704 a first orientation mode for the context. In one or more examples, the method 700 further includes setting 706 an orientation mode for a navigation module to a first orientation mode based on the determined context. In one or more examples, the method 700 further includes displaying 708 map data on a display in communication with the navigation module using the first orientation mode. In one or more examples, the method 700 further includes confirming 710 the determined context with a user. In one or more examples, the method 700 further includes changing 712 the orientation mode from the first orientation mode to a second orientation mode in response to user input identifying a different context from the determined context. In certain embodiments, changing 712 the orientation mode may include adjusting the weights of a neural network such that determination of a context, selection of an orientation mode, and/or response to a trigger event 506, is more aligned with a user's preferences, habits, and/or desires over time, as the system learns based on changes made by a user and/or external events (e.g., external trigger events 506b).

In various examples, the method 700 may be implemented substantially as described above with respect to the features, aspects, and/or functions of the apparatus 200, navigation system 300, the system 500, and/or the method 600 depicted respectively in FIGS. 2, 3, 5, and 6.

In one or more examples, the method 600, the method 700, and/or the features, aspects, and/or functions of the apparatus 200, navigation system 300, the system 500, may be implemented in a computer program product. For example, a computer program product, may include a machine-readable storage medium having program instructions embodied therewith, where the program instructions are executable by a processor to cause the processor to: determine a context for a route to be navigated by a user based on one or more factors; determine an orientation mode for the context; set an orientation mode for a navigation module to a first orientation mode based on the a determined context; display map data on a display in communication with the navigation module using the first orientation mode; confirm the determined context with a user; and change the orientation mode from the first orientation mode to a second orientation mode in response to user input identifying a different context from the determined context.

Thus, the apparatus 200, the system 300, the system 500, and the methods 600 and 700, and a computer program such as described above may operate individually or collectively according to the various examples disclosed to set or change orientation mode and may thereby improve navigation experience for the user.

Examples may be practiced in other specific forms. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
 a processor; and
 a memory that stores code executable by the processor that causes the processor to:
  determine a route to be navigated by a user;
  determine, without a user input, a context of a plurality of contexts for the determined route, wherein:
   the context includes a frame of reference related to a user of the apparatus for the determined route, and
   the context is based on at least one factor corresponding to the user in relation to the determined route;
  determine a directional orientation mode of a plurality of directional orientation modes for a navigation system based on the determined context for the determined route;
  automatically set the navigation system to the determined directional orientation mode in response to determining the directional orientation mode that is based on the determined context; and
  display the determined route on the navigation system with the determined directional orientation mode.

2. The apparatus of claim 1, wherein the code is further executable by the processor to:
    detect a trigger event; and
    change the orientation mode for the navigation system from the determined directional orientation mode to a different directional orientation mode of the plurality of directional orientation modes in response to detecting the trigger event.

3. The apparatus of claim 2, wherein the trigger event comprises the user approaching a waypoint along the determined route.

4. The apparatus of claim 2, wherein the trigger event comprises the user leaving a waypoint along the determined route.

5. The apparatus of claim 2, wherein the trigger event comprises a change in one or more factors that define the context.

6. The apparatus of claim 2, wherein the trigger event comprises a user input that identifies the different directional orientation mode and wherein the determined directional orientation mode comprises a heading up directional orientation mode and the different directional orientation mode comprises a north up directional orientation mode.

7. The apparatus of claim 6, wherein the code is further executable by the processor to change to the determined directional orientation mode associated with the context to the different directional orientation mode in response to the user input that identifies the different directional orientation mode.

8. The apparatus of claim 6, wherein the code is further executable by the processor to prompt the user for confirmation that the user wants to change an association between the determined directional orientation mode and the context to the different directional orientation mode in response to the user input that identifies the different directional orientation mode.

9. The apparatus of claim 2, wherein the trigger event comprises the user leaving the determined route.

10. The apparatus of claim 2, wherein the code is further executable by the processor to:
    update a frequency metric for a change from the directional orientation mode to the different directional orientation mode based on the trigger event; and
    associate the different directional orientation mode with the context in response to the frequency metric satisfying a threshold such that the different directional orientation mode is used for the directional orientation mode on a subsequent navigation by the user within the context.

11. A method, comprising:
    determining, by a processor, a route to be navigated by a user;
    determining, by the processor without a user input, a context of a plurality of contexts for the determined route, wherein:
        the context includes a frame of reference related to a user of the apparatus for the determined route, and
        the context is based on one or more factors corresponding to the user in relation to the determined route;
    determining, by the processor, a directional orientation mode of a plurality of directional orientation modes for a navigation system based on the determined context for the determined route;
    automatically setting, by the processor, the navigation system to the determined directional orientation mode in response to determining the directional orientation mode that is based on the determined context; and
    displaying, by the processor, the determined route on a display of the navigation system with the determined directional orientation mode.

12. The method of claim 11, further comprising:
    detecting, by the processor, a trigger event; and
    changing, by the processor, the directional orientation mode for the navigation system from the determined directional orientation mode to a different directional orientation mode of the plurality of directional orientation modes in response to detecting the trigger event.

13. The method of claim 12, wherein the trigger event comprises the navigation system approaching a waypoint along the determined route.

14. The method of claim 12, wherein the trigger event comprises the navigation system leaving a waypoint along the determined route.

15. The method of claim 12, wherein the trigger event comprises the determined route changing to an alternative route.

16. The method of claim 12, wherein the trigger event comprises a change in the one or more factors that define the context.

17. The method of claim 12, wherein the trigger event comprises a user input that identifies the different directional orientation mode.

18. The method of claim 17, further comprising changing the directional orientation mode associated with the context to the different directional orientation mode in response to the user input that identifies the different directional orientation mode and based on a frequency metric for the change to the different directional orientation mode.

19. The method of claim 11, wherein the one or more factors comprise one or more of a weather condition, a time of day, a day within a calendar of the user, a means of transportation being used for navigating the determined route, a mode of transport, a particular user that is the user, a navigation module of the navigation system, one or more readings from one or more sensors, a role for the user while navigating the determined route, a particular route defined as the determined route, a speed of the user, a type of destination for the determined route, and a visit history for the user of a locale that includes the determined route.

20. A program product comprising a non-transitory computer-readable storage medium that stores code executable by a processor, the executable code comprising code that causes the processor to:
    determine a route to be navigated by a user;
    determine, without a user input, a context of a plurality of contexts for the determined route, wherein:
        the context includes a frame of reference related to a user of the apparatus for the determined route, and
        the context is based on one or more factors corresponding to the user in relation to the determined route;
    determine a directional orientation mode of a plurality of directional orientation modes for a navigation system based on the determined context for the determined route;
    automatically set the navigation system to the determined directional orientation mode in response to determining the directional orientation mode that is based on the determined context;
    display the determined route on a display of the navigation system with the determined directional orientation mode;
    confirm the determined directional orientation with the user; and change the determined directional orientation mode to a different directional orientation mode in response to user input identifying a different context from the context for the determined route.

\* \* \* \* \*